United States Patent
Suzuki et al.

(10) Patent No.: US 6,278,609 B1
(45) Date of Patent: *Aug. 21, 2001

(54) ELECTRONIC DEVICE HAVING IC CARD SLOT

(75) Inventors: Masumi Suzuki; Akira Ueda, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,131

(22) Filed: Jun. 27, 1997

(30) Foreign Application Priority Data

Jan. 14, 1997 (JP) .................................. 9-004573

(51) Int. Cl.⁷ ...................................... H05K 7/20
(52) U.S. Cl. ...................... 361/704; 257/722; 361/720
(58) Field of Search .......................... 257/722; 361/687, 361/690, 704, 707, 719, 720, 725, 727, 752, 784, 790

(56) References Cited

U.S. PATENT DOCUMENTS

| 4,502,098 | * | 2/1985 | Brown et al. | 361/690 |
| 4,785,379 | * | 11/1988 | Goodrich | 361/690 |
| 4,853,828 | * | 8/1989 | Penn | 174/16.3 |
| 4,953,058 | * | 8/1990 | Harris | 361/690 |
| 5,521,792 | * | 5/1996 | Pleitz et al. | 361/715 |
| 5,815,371 | * | 9/1998 | Jeffries et al. | 361/704 |

FOREIGN PATENT DOCUMENTS

| 1-165198 | | 6/1989 | (JP) . |
| 3250697 | * | 11/1991 | (JP) . |
| 7-45981 | | 2/1995 | (JP) . |

* cited by examiner

Primary Examiner—Gregory Thompson
(74) Attorney, Agent, or Firm—Armstrong, Westerman, Hattori, McLeland & Naughton, LLP

(57) ABSTRACT

An electronic device having an IC card slot into which an IC card is removably inserted. The IC card slot has a slot side connector to which a card side connector of the IC card is electrically connected and a socket formed in an approximately U-shaped. The slot side connector is mounted on a bottom portion of the socket. Guide grooves for guiding side edge portions of the IC cards are formed in an inner surface portion of each of guide rail portions formed on both sides of the socket, and a plurality of heat radiation fins are formed on an outer surface portion of each guide rail portion. The socket is made of a metal material having a high thermal conductivity. Heat generated from the IC card is radiated via the guide rail portions and the heat radiation fins.

1 Claim, 7 Drawing Sheets

ELECTRONIC DEVICE HAVING IC CARD SLOT

BACKGROUND OF THE INVENTION

1. Field of the Invention

The present invention relates to an electronic device having an IC card slot into which an IC card is removably inserted, and particularly to a technique for cooling an IC card inserted into the IC card slot of the electronic device.

2. Description of the Related Art

A portable electronic device such as a note-type personal computer has been required to be reduced in size and weight along with enhanced/expanded functions, and to meet these incompatible requirements, there has been adopted a structure having an IC card slot into which an IC card prepared under a standard of PCMCIA, etc. is removably inserted. The IC card, which is prepared for each extension function (expansion memory, communication modem, hard disk unit, etc.), is produced, for example by a method wherein a printed wiring board mounted with electronic parts such as an LSI is covered with a resin material by resin molding in the form of a card-shape or it is contained in a box-like metal card housing. The IC card is inserted into an IC card slot by a user, as needed.

An IC card slot provided in an electronic device has guide rail portions for guiding both side portions of an IC card and a connector to which a connector provided at a leading end portion of the IC card is fittingly connected. The guide rail portions, generally made of a resin material, are fixed on a mother board (printed wiring board) by screws, and the mother board in such a state is contained in a housing of the electronic device. A housing of the electronic device has at a portion corresponding to the IC card slot an opening through which the IC card is to be inserted. The IC card is introduced through the opening, and further inserted along the guide rail portions until the connector provided at the leading end portion of the IC card is fitted to the connector of the IC card slot, to be thus mounted in the electronic device.

The recent tendency toward higher integration of such an IC card increases an amount of heat generated from the IC card, and further, it is being examined to mount a CPU having an extremely large amount of heat generation on the IC card. However, since the related art electronic device has failed to take any special measure for cooling an IC card, there have arisen problems that the IC card suffers malfunction or failure due to heating of the IC card by self-heat generation thereof, obstructing the higher integration of the IC card, and that it is difficult to mount an electronic part having a large amount of heat generation such as a CPU. In addition, there has arisen a further problem that since heat generated from an IC card makes the IC card hot even though it does not cause any malfunction, the hot IC card gives a discomfort feeling to a user when he takes it from an electronic device after use.

SUMMARY OF THE INVENTION

An object of the present invention is to provide an electronic device having an IC card slot, which enables high integration of an IC card by cooling the IC card at a high efficiency and also enables mounting of an electronic part having a large amount of heat generation such as a CPU on the IC card.

In accordance with an aspect of the present invention, there is provided an electronic device having an IC card slot into which an IC card is removably inserted, the IC card slot including: a pair of guide rail members for guiding the IC card; and a heat receiving member for receiving heat generated from the IC card inserted along the guide rail members.

In the electronic device having an IC card slot according to the present invention, since the IC card slot includes the heat receiving member, heat generated from an IC card inserted into the IC card slot is received by the heat receiving member and is radiated therefrom, whereby the IC card is prevented from being heated at a high temperature by self-heat generation thereof. This makes it possible to realize higher integration of the IC card, and to mount an electronic part having a large amount of heat generation such as a CPU on the IC card. In addition, it is possible to reduce the degree of discomfort feeling given to a user by a hot IC card when he takes it out of the electronic device after use.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 12:
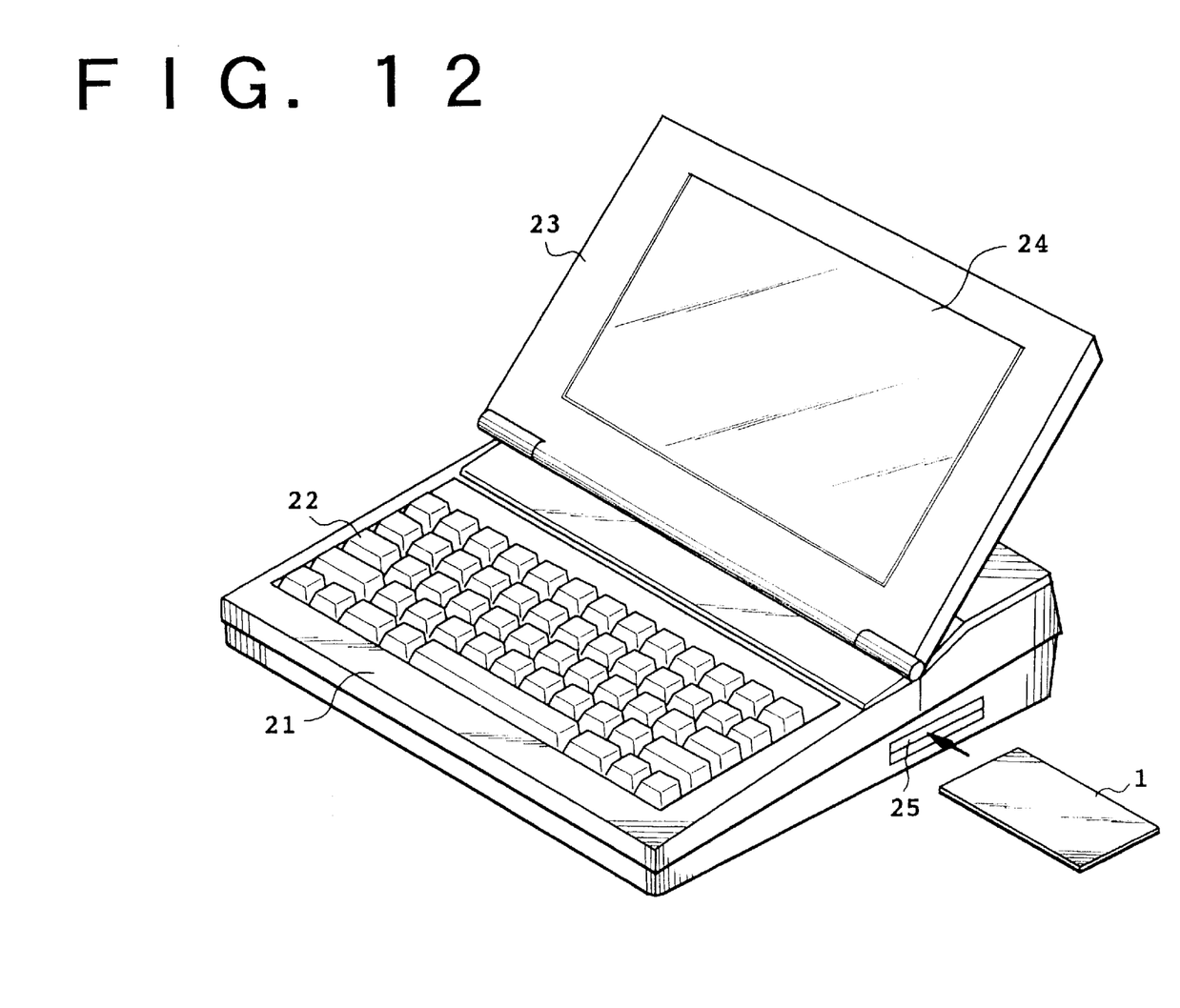
FIG. 12 is a perspective view showing one example of an electronic device to which the present invention is applied.

FIG. 12 is a perspective view showing an external configuration of a note type personal computer as one example of an electronic device to which the present invention is applied. In this figure, reference numeral 21 indicates a device main body having a key board 22 for input operation, and 23 is a display unit having a display screen 24 and openably (turnably) supported on the device main body 21. The device main body 21 has in a side surface portion thereof an approximately rectangular card insertion opening 25 constituting part of an IC card slot whose configuration will be described in detail later.

An IC card 1, which is removably inserted into the IC card slot as needed, is configured under a standard of PCMCIA, etc., to be thus standardized. The IC card 1 is prepared for each extension function (expansion memory, communication modem, hard disk unit, etc.). The IC card is produced, for example, by a method wherein a printed wiring board mounted with electronic parts (a CPU chip, LSI chip, memory chip, etc.) including heat generating parts is covered with a resin material by resin molding in the form of a card-shape or it is contained in a box-like card housing.

The card housing includes a pair of sheet-like covers and a frame. Each cover is made of a metal material having a high thermal conductivity such as copper or a non-metallic material having a high thermal conductivity such as carbon fibers. Similarly, the frame is made of a material having a high thermal conductivity. A card side connector is provided at one end portion of the IC card 1 in the longitudinal direction.

[Embodiment 1]

Figure 1:
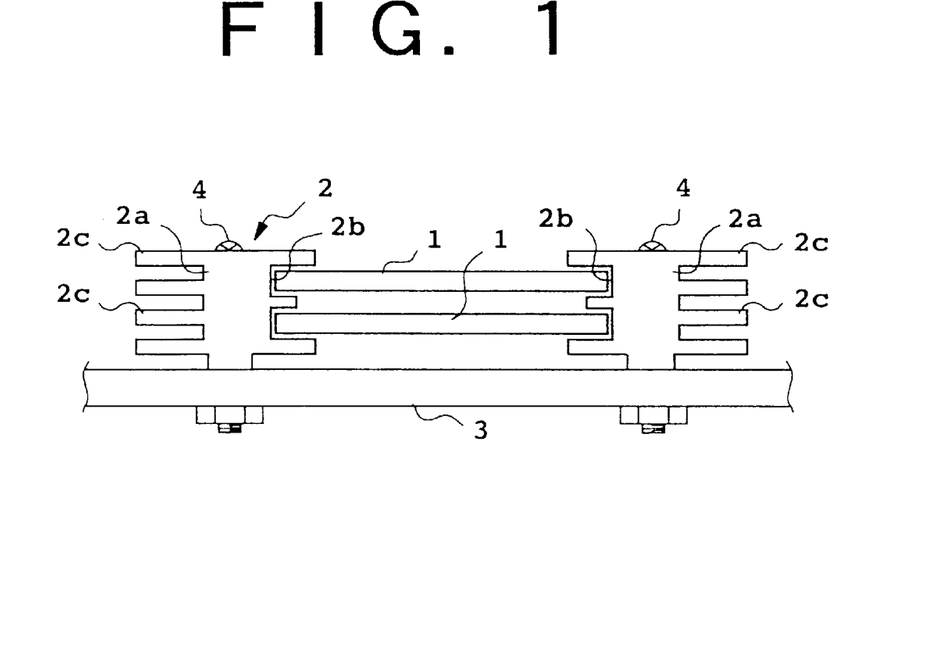
FIG. 1 is a front view showing a configuration of a first embodiment of the present invention.

A first embodiment of the present invention will be described with reference to FIG. 1. An IC card slot has a slot side connector to which the card side connector of the IC card 1 is to be electrically connected and a socket 2 formed in an approximately U-shape (see FIG. 5). A slot side connector (not shown) is mounted on a connector portion (connector member) positioned on a bottom portion of the socket 2. The socket 2 has a pair of guide rail portions (guide rail members) 2a, 2a opposite to each other with the connector portion put therebetween, and two steps of guide grooves 2b for guiding a side edge portion of the IC card 1 are formed in an inner surface portion of each of the guide rail portions 2a.

An outer surface portion of the guide rail portion 2a constitutes a heat radiation portion (heat radiation member or heat receiving member), and a plurality of heat radiation fins 2c are formed on the heat radiation portion. The socket 2 composed of the connector portion, guide rail portions and heat radiation portion is formed of a metal material into one body. The socket 2 can be produced by die-casting and cutting a metal material selected from stainless steel, aluminum, copper and other metal materials having high thermal conductivities.

The socket 2 is fixed on a mother board (printed wiring board) 3 with a plurality of screws 4. The slot side connector mounted on the connector portion of the socket 2 is electrically connected to a wiring pattern formed on the mother board 3. The mother board 3 to which the socket is thus fixed is contained in a housing of the electronic device. The housing of the electronic device has an opening penetrating through a wall surface portion from inside to outside, and a card introducing side (opposed to the connector portion) of the socket 2 is positioned in the vicinity of an inner surface of the opening.

The IC card 1 is introduced from the opening of the housing of the electronic device and is further inserted along the guide grooves 2b of the guide rail portions 2a of the socket 2a until the card side connector is fittingly connected to the slot side connector, to be thus removably mounted in the electronic device. The socket 2 shown in FIG. 1 is of a type capable of two pieces of the IC cards 1 in the vertical direction; however, it may be of a type capable of only one piece of the IC card 1 or a type capable of a plurality of the IC cards 1.

In a state in which the IC card 1 is inserted into the IC card slot, heat generated from the electronic parts mounted inside the IC card 1 is transferred to the guide rail portions 2a of the socket 2 made of a metal material having a high thermal conductivity via portions near both side edges of the card housing and is highly efficiently radiated via the plurality of radiation fins 2c, so that the IC card is usually kept at a suitable temperature or less and thereby it is prevented from suffering malfunction or failure due to heating at a high temperature by self-heat generation thereof. Further, the highly efficient heat radiation effect makes it possible to increase the level of integration of the IC card 1 and also to mount an electronic part having a large amount of heat generation such as a CPU on the IC card 1. According to this embodiment, therefore, it becomes possible to enlarge the scope of application of the IC card 1. In addition, it is possible to reduce the degree of discomfort feeling given to a user by a hot IC card when he takes it out of the electronic device after use.

[Embodiment 2]

Figure 2:
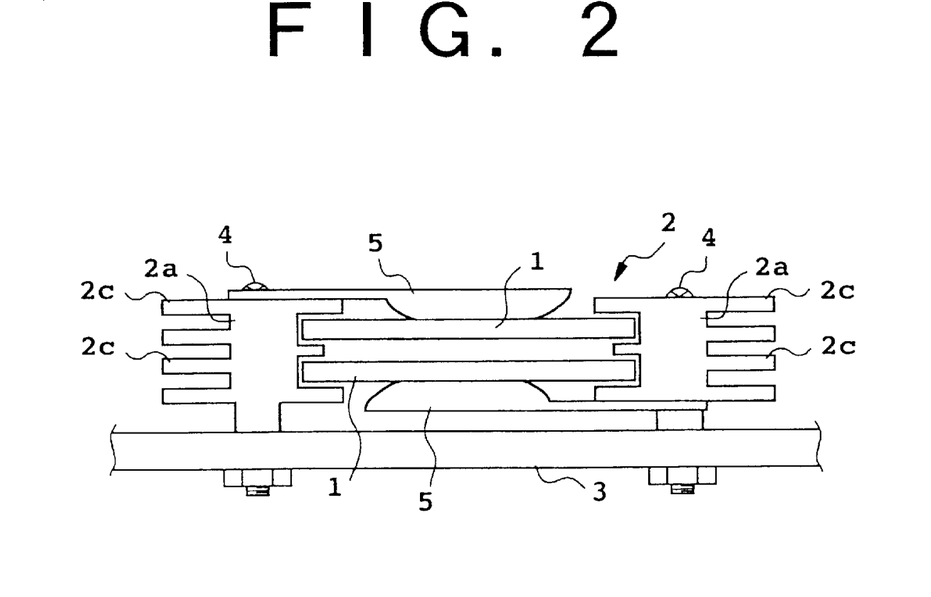
FIG. 2 is a front view showing a configuration of a second embodiment of the present invention.

A second embodiment of the present invention, which is intended to improve the first embodiment, will be described with reference to FIG. 2. Parts corresponding to those in the first embodiment are indicated by the same numerals and the explanation thereof is omitted.

In the second embodiment, a pair of heat receiving plates (heat transfer members or heat receiving members) 5 are mounted on the guide rail portions 2a through the screws 4. Each of the heat receiving plates 5 is formed of an elastic metal material (aluminum, stainless steel, etc.) having a high thermal conductivity. The heat receiving plate 5 has a card contact portion positioned between both the guide rail portions 2a of the socket 2. When the IC card 1 is inserted along the guide grooves 2b, the card contact portions are brought in press-contact with a central portion of the card housing of the IC card 1 by self-elasticities thereof.

In a state in which the IC card 1 is inserted into the IC card slot, heat generated from electronic parts mounted inside the IC card 1 is transferred to the guide rail portions 2a via not only the portions near both the side edges of the card housing but also the heat receiving plates 5 and is highly efficiently radiated via the plurality of the heat radiation fins 2c. Consequently, the second embodiment is superior in heat radiation efficiency to the first embodiment. Also, since the heat receiving plates 5 functioning as heat radiation members are expected to effect direct heat radiation therefrom, it becomes possible to further improve the heat radiation efficiency.

[Embodiment 3]

Figure 3:
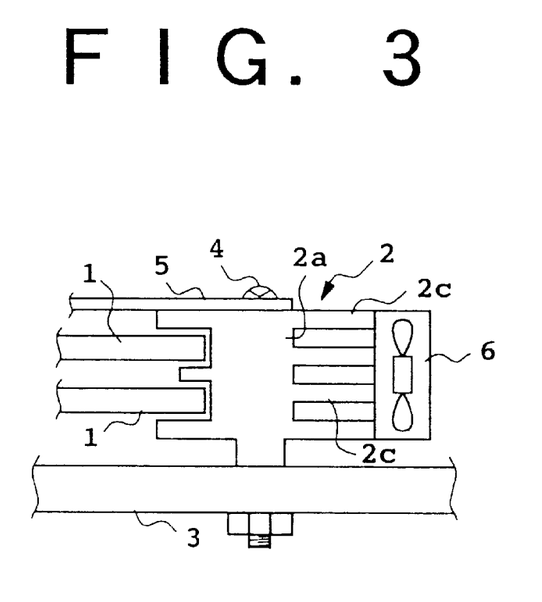
FIG. 3 is a front view showing a configuration of a third embodiment of the present invention, with components partially omitted.

A third embodiment of the present invention, which is intended to improve the first embodiment, will be described with reference to FIG. 3. Parts corresponding to those in the first embodiment are indicated by the same numerals and the explanation thereof is omitted.

In the third embodiment, heat radiation fans 6 are mounted on the guide rail portions 2a. The heat radiation fan 6 has a propeller rotating by a drive motor for generating an air flow in the vicinity of the heat radiation fins 2c. The heat radiation effect of the heat radiation fins 2c is improved by forced-air cooling due to the air flow generated by the heat radiation fans 6. The number and location of the heat radiation fans 6 are not limited to those shown in FIG. 3.

[Embodiment 4]

Figure 4:
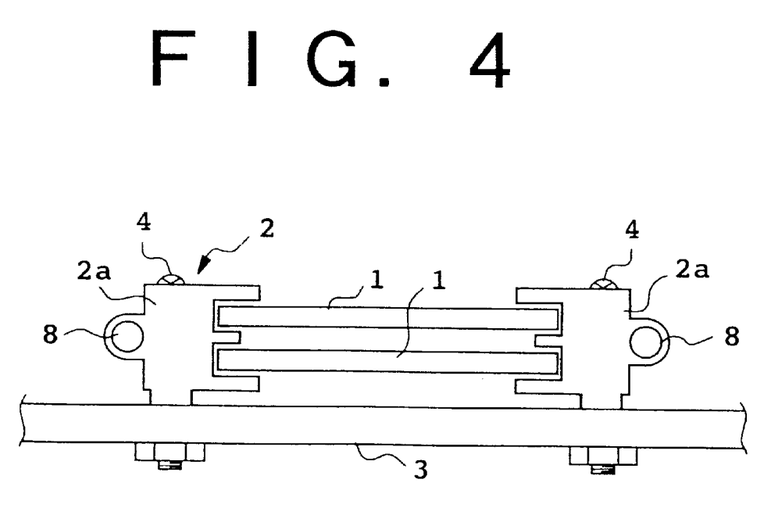
FIG. 4 is a front view showing a configuration of a fourth embodiment of the present invention.
Figure 5:
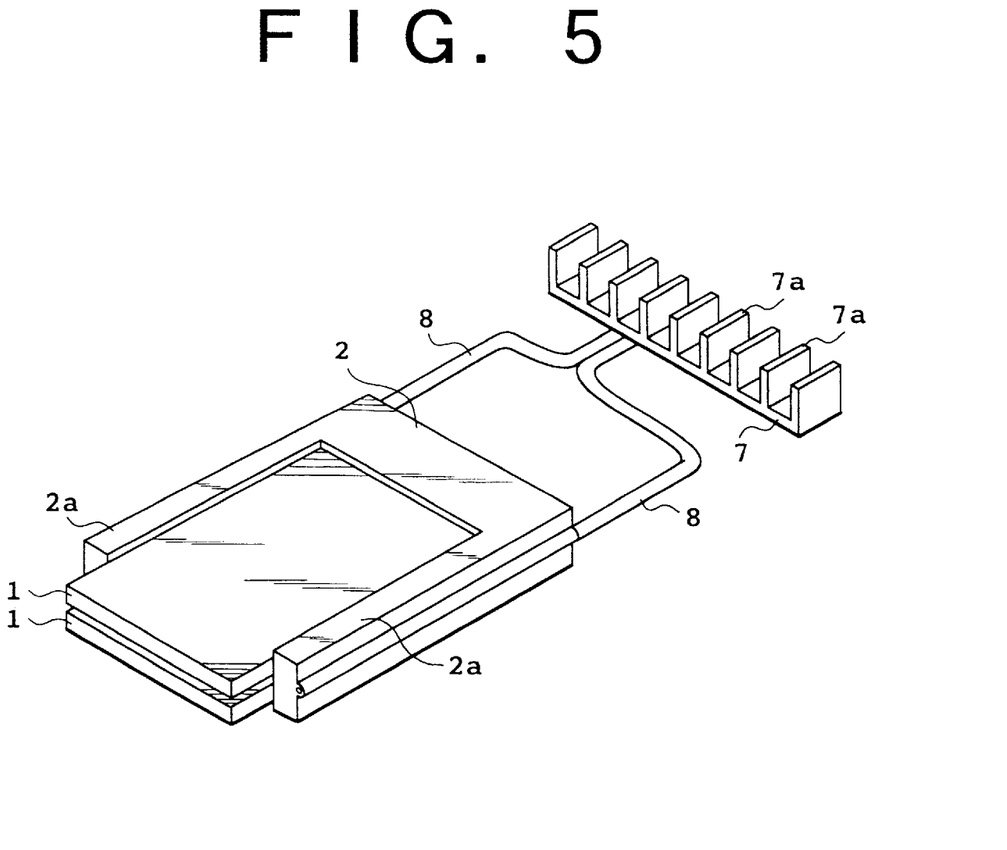
FIG. 5 is a perspective view of the fourth embodiment of the present invention.

A fourth embodiment of the present invention will be described with reference to FIGS. 4 and 5. Parts corresponding to those in the first embodiment are indicated by the same numerals and the explanation thereof is omitted. The socket 2 in the fourth embodiment does not have the heat radiation fins 2c formed integrally with the guide rail portions 2a as in the first embodiment. In the fourth embodiment, a heat radiation member (heat sink) 7 having a plurality of radiation fins 7a is provided independently from the socket 2. Further, heat pipes 8 are provided between the guide rail portions 2a of the socket 2 and the heat radiation member 7 in such a manner that a portion near one end of each heat pipe 8 is connected or buried with or in each guide rail portion 2a and a portion near the other end of the heat pipe 8 is connected or buried with or in the heat radiation member 7. The heat pipes 8 are means for positively moving heat from a high temperature side to a low temperature side by action of working fluid enclosed therein.

In a state in which the IC card 1 is inserted into the IC card slot, heat generated from electronic parts mounted inside the IC card 1 is transferred to the guide rail portions 2a of the socket 2 made of a metal material having a high thermal conductivity via the portions near both the side edges of the card housing, being further transferred to the heat radiation member 7 via the heat pipes 8, and is highly efficiently radiated via the plurality of heat radiation fins 7a. Consequently, the IC card is usually kept at a suitable temperature or less, and thereby it is prevented from suffering malfunction or failure due to heating at a high temperature by self-heat generation thereof.

Further, since heat generated from the IC card is carried to a position apart from the IC card 1 by the heat pipes 8, the IC card 1 can be cooled without increasing an environmental temperature of the IC card 1. The heat radiation member 7 can be located at a position where the heat radiation efficiency is most preferable in the housing of the electronic device. For example, radiation of heat generated from the IC card can be performed at a high efficiency by provision of the heat radiation member 7 at a position in the vicinity of a cooling fan for cooling a CPU and a power supply mounted on the mother board 3 or at a position exposed outside the housing of the electronic device.

[Embodiment 5]

Figure 6:
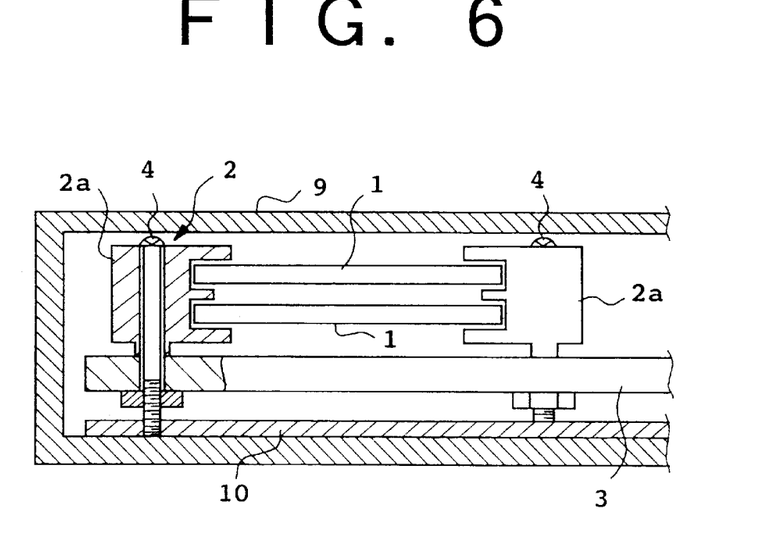
FIG. 6 is a sectional front view showing a configuration of a fifth embodiment of the present invention.
Figure 7:
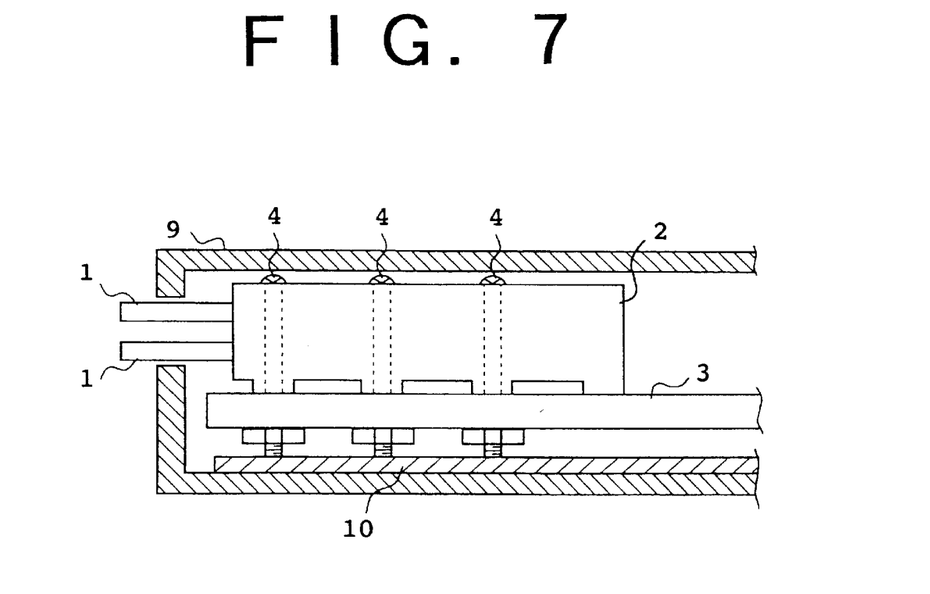
FIG. 7 is a sectional side view showing the configuration of the fifth embodiment of the present invention.

A fifth embodiment of the present invention will be described with reference to FIGS. 6 and 7. Parts corresponding to those in the first embodiment are indicated by the same numerals and explanation thereof is omitted. In the fifth embodiment, a heat radiation metal plate 10 is provided in such a manner as to be brought in close-contact on an inner surface of the housing 9 of the electronic device. The leg portions of the screws 4 fixing the socket 2 on the mother board 3 are made longer, and leading ends thereof are screwed or brought in contact with the heat radiation metal plate 10. The heat radiation metal plate 10 is made of a metal material having a high thermal conductivity, such as aluminum or stainless steel.

In a state in which the IC card is inserted into the IC card slot, heat generated from electronic parts mounted inside the IC card is transferred to the guide rail portions 2a of the socket 2 via the portions near both the side edges of the card housing, being further transferred to the heat radiation metal plate 10 via the screws 4, and is radiated from the heat radiation metal plate 10 via the housing 9 of the electronic device. The heat radiation metal plate 10 may be provided for only heat radiation purpose; however, it can serve as a metal plate which is provided for shielding electromagnetic waves in the case where the housing 9 of the electronic device is made of a resin material.

[Embodiment 6]

Figure 8:
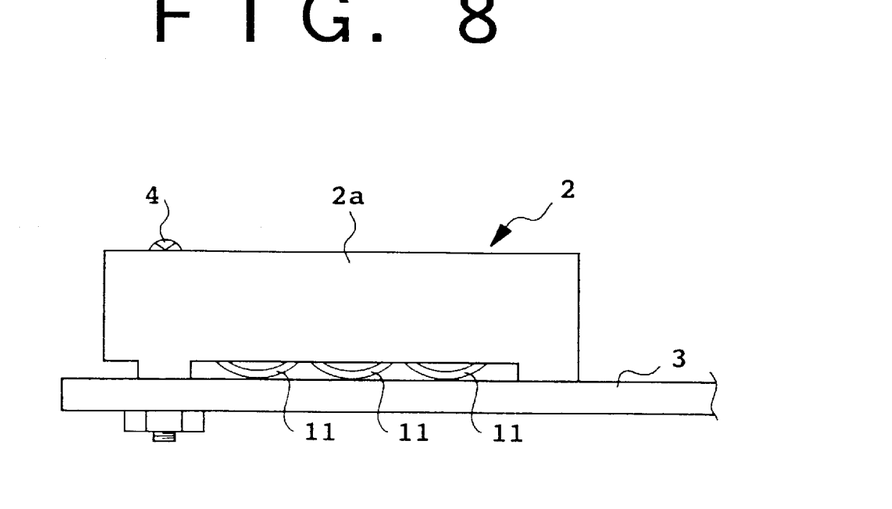
FIG. 8 is a side view showing a configuration of a sixth embodiment of the present invention.

A sixth embodiment of the present invention will be described with reference to FIG. 8. Parts corresponding to those in the first embodiment are indicated by the same numerals and explanation thereof is omitted. In the sixth embodiment, a plurality of heat transfer springs 11 are mounted on the guide rail portions 2a of the socket 2 on the mother board 3 side. The plurality of heat transfer springs 11 can be formed integrally with the guide rail portions 2a of the socket 2.

In a state in which the IC card is inserted into the IC card slot, heat generated from electronic parts mounted inside the IC card is transferred to the guide rail portions 2a of the socket 2 via the portions of both the side edges of the card housing and is further transferred to the mother board 3 via the plurality of heat transfer springs 11, to thereby keep the IC card 1 at a suitable temperature.

[Embodiment 7]

Figure 9:
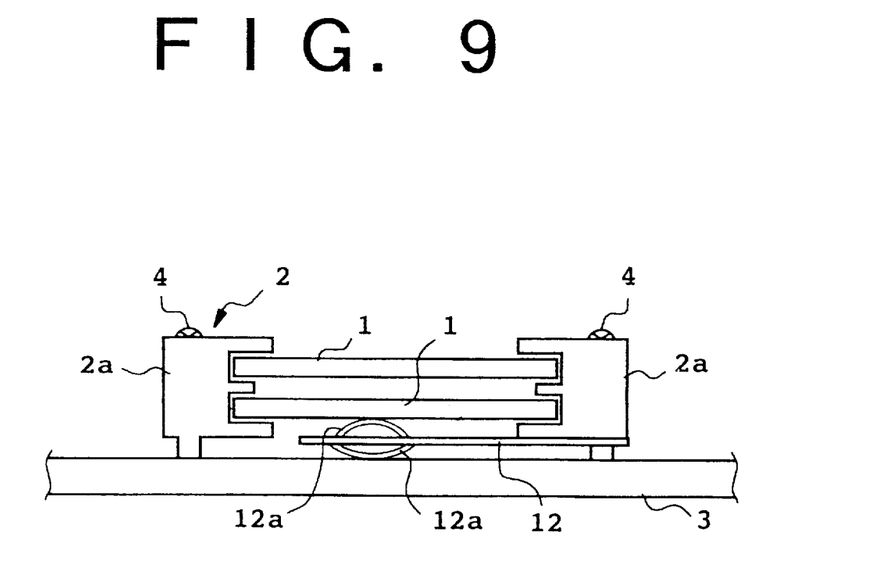
FIG. 9 is a front view showing a configuration of a seventh embodiment of the present invention.

A seventh embodiment of the present invention will be described with reference to FIG. 9. Parts corresponding to those in the first embodiment are indicated by the same numerals and the explanation thereof is omitted. A heat receiving plate (heat transfer member) 12 is mounted on the guide rail portion 2a by the screw 4. The heat receiving plate 12 is formed of a metal material (aluminum, stainless steel, etc.) having a high thermal conductivity, and it has a card contact portion 12a positioned between both the guide rail portions 2a of the socket 2. The card contact portion 12a is a spring portion, which is brought in press-contact with both the central portion of the card housing of the IC card 1 and the mother board 3 by self-elastic force when the IC card 1 is inserted along the guide grooves 2b.

In a state in which the IC card is inserted into the IC card slot, heat generated from electronic parts mounted inside the IC card 1 is transferred to the mother board 3 not only via the socket 2 but also via the heat receiving plate 12, to thereby more highly efficiently cool the IC card 1.

[Embodiment 8]

Figure 10:
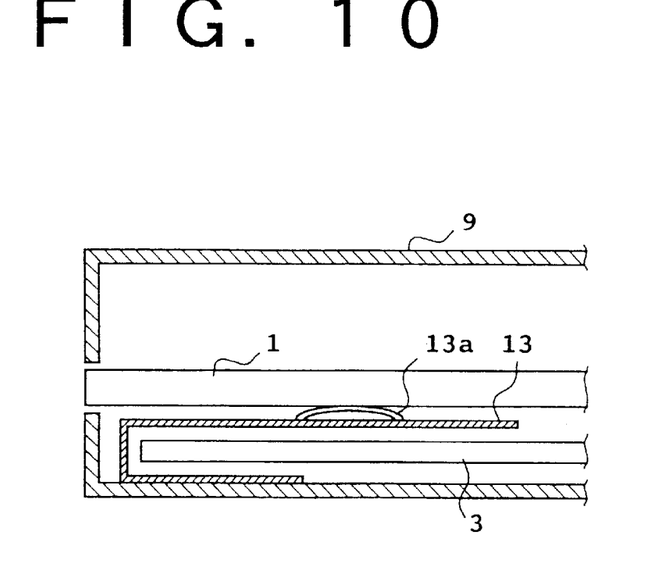
FIG. 10 is a sectional view showing a configuration of an eighth embodiment of the present invention.

An eighth embodiment of the present invention will be described with reference to FIG. 10. Parts corresponding to those in the first embodiment are indicated by the same numerals and the explanation thereof is omitted. In the eighth embodiment, there is provided a heat receiving plate 13 made of an elastic metal material (aluminum, stainless steel, etc.). The heat receiving plate 13 is fixed on an inner surface of the housing 9 of the electronic device in such a manner that a portion near one end thereof is positioned between both the guide rail portions 2a of the socket 2, an intermediate portion thereof bypasses the mother board 3, and a portion near the other end thereof is brought in close-contact with the inner surface of the housing 9. A spring portion 13a brought in press-contact with the central portion of the card housing of the IC card 1 is formed on the portion near the one end of the heat receiving plate 13.

In a state in which the IC card is inserted into the IC card slot, heat generated from electronic parts mounted inside the IC card is transferred to the portion near the one end of the heat receiving plate 13 via the spring portion 13a, being further transferred to the portion near the other end of the heat receiving plate 13, and is radiated via the housing 9.

[Embodiment 9]

Figure 11:
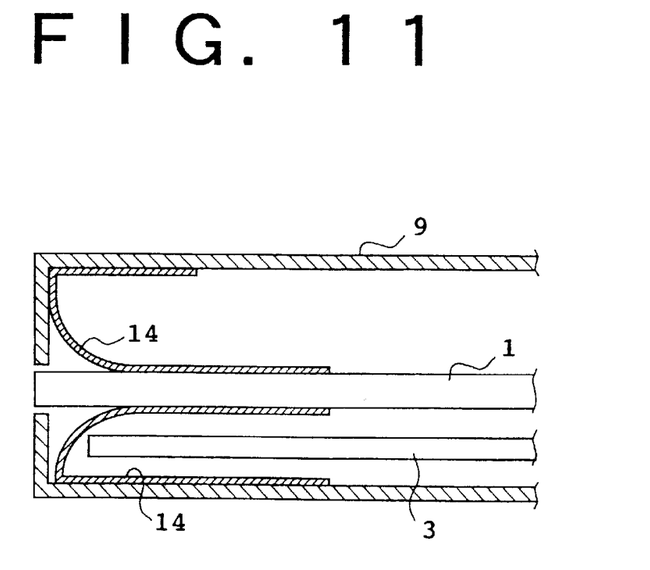
FIG. 11 is sectional view showing a ninth embodiment of the present invention.

A ninth embodiment of the present invention will be described with reference to FIG. 11. Parts corresponding to those in the first embodiment are indicated by the same numerals and the explanation thereof is omitted. In the ninth embodiment, there are provided a pair of upper and lower heat receiving plates (heat transfer members) 14, 14 made of an elastic metal material. The lower heat receiving plate 14 is fixed on the inner surface of the housing 9 of the electronic device in such a manner that a portion near one end thereof is positioned between both the guide rail portions 2a of the socket 2, an intermediate portion thereof bypasses the mother board 3, and a portion near the other end thereof is brought in close-contact with the inner surface of the housing 9. The upper heat receiving plate 14 is fixed on the inner surface of the housing 9 of the electronic device in such a manner that a portion near one end thereof is positioned between both the guide rail portions 2a of the socket 2, and a portion near the other end thereof is brought in close-contact with the inner surface of the housing 9.

In a state in which the IC card is inserted into the IC card slot, the IC card is held between the pair of heat receiving plates 14. Heat generated from electronic parts mounted inside the IC card 1 is transferred to the portion near the one end of each heat receiving plate 14 via the card housing, being further transferred to the portion near the other end of the heat receiving plate 14, and is radiated via the housing 9.

The configurations described in the first to ninth embodiments are for only illustrative purposes, and they can be used solely or in combination.

According to the present invention having the above configurations, it is possible to highly efficiently radiate heat generated from an IC card inserted into the IC card slot, and hence to prevent occurrence of malfunction and failure due to heating of the IC card at a high temperature by self-heat generation thereof, to make higher integration of such an IC card possible and also to mount an electronic part having a large amount of heat generation such as a CPU. In addition, it is also possible to reduce the degree of discomfort feeling given to a user by a hot IC card when he takes it out of the electronic device after use.

What is claimed is:

1. An electronic device having a plurality of IC card slots into any of which an IC card is removably inserted, said electronic device comprising:

a pair of guide rail members each integrally forming a heat receiving member and each containing a plurality of guide grooves for guiding said IC card, wherein each said heat receiving member receives heat generated from said IC card inserted along one of said plurality of guide grooves, and wherein each of said guide rail members has a plurality of heat radiation fins formed integrally therewith;

a printed wiring board onto which said guide rail members are mounted; and an elastic heat transfer member adapted to be brought into press-contact with a housing of said IC card when said IC card is inserted along said guide rail members, wherein ridges forming said plurality of guide grooves in each of said guide rail members extend from said guide rail members parallel to said IC card and said printed wiring board.

* * * * *